(12) United States Patent
Garrett

(10) Patent No.: US 10,857,945 B2
(45) Date of Patent: Dec. 8, 2020

(54) CARGO DRAWER FOR A PICKUP TRUCK

(71) Applicant: Joseph Garrett, Parma, MI (US)

(72) Inventor: Joseph Garrett, Parma, MI (US)

(73) Assignee: Joseph Garrett, Parma, MI (US)

( * ) Notice: Subject to any disclaimer, the term of this patent is extended or adjusted under 35 U.S.C. 154(b) by 0 days.

(21) Appl. No.: 15/972,183

(22) Filed: May 6, 2018

(65) Prior Publication Data

US 2019/0337457 A1   Nov. 7, 2019

(51) Int. Cl.
| | |
|---|---|
| *B60R 5/00* | (2006.01) |
| *B60R 5/04* | (2006.01) |
| *B60R 7/00* | (2006.01) |
| *B60R 9/00* | (2006.01) |
| *B60R 9/06* | (2006.01) |
| *B60R 7/02* | (2006.01) |
| *B62D 25/20* | (2006.01) |
| *B62D 33/04* | (2006.01) |
| *B60R 9/08* | (2006.01) |
| *B60R 11/00* | (2006.01) |
| *B60P 3/00* | (2006.01) |
| *B62D 33/00* | (2006.01) |

(52) U.S. Cl.
CPC .............. *B60R 5/041* (2013.01); *B60P 3/007* (2013.01); *B60R 5/00* (2013.01); *B60R 5/04* (2013.01); *B60R 7/00* (2013.01); *B60R 7/02* (2013.01); *B60R 9/00* (2013.01); *B60R 9/06* (2013.01); *B60R 9/065* (2013.01); *B60R 9/08* (2013.01); *B60R 11/00* (2013.01); *B62D 25/2054* (2013.01); *B62D 33/00* (2013.01); *B62D 33/04* (2013.01); *B62D 33/042* (2013.01)

(58) Field of Classification Search
CPC   B60R 5/041; B60R 11/00; B60R 9/08; B60R 5/00; B60R 7/02; B60R 9/065; B60R 9/06; B60R 9/00; B60R 7/00; B60R 5/04; B62D 33/042; B62D 33/00; B62D 33/04; B62D 25/2054; B60P 3/007
USPC ......... 296/26.09, 37.6, 26.08, 26.1; 224/310, 224/403–404, 281, 554; 414/522
See application file for complete search history.

(56) References Cited

U.S. PATENT DOCUMENTS

| | | | |
|---|---|---|---|
| 4,573,731 A | 3/1986 | Knaack | |
| 6,065,792 A * | 5/2000 | Sciullo | .................... B60P 1/003 296/26.09 |
| 6,322,123 B1 | 11/2001 | Garrison | |
| 6,328,365 B1 | 12/2001 | Adsit | |
| 6,860,536 B1 * | 3/2005 | Schimunek | ............. B60R 11/00 296/26.09 |
| 7,240,939 B2 * | 7/2007 | Vandekerkhof | ........... B60P 3/40 296/26.09 |

\* cited by examiner

*Primary Examiner* — Stephen T Gordon

(57) ABSTRACT

The invention is directed to a cargo drawer for a pickup truck. The drawer which rolls outward from the rear end of the truck on a pair of rails in much the same manner as a desk drawer, and is designed to be sturdy and reliable, for use in any challenging environment. The drawer may be locked in place at any position along the rails. One or more handles are provided near the rear edge of the drawer, with a lever which may be pressed to release the lock. The drawer further provides a pair of folding or telescoping legs at the rear corners, to support the drawer in a fully extended position.

1 Claim, 5 Drawing Sheets

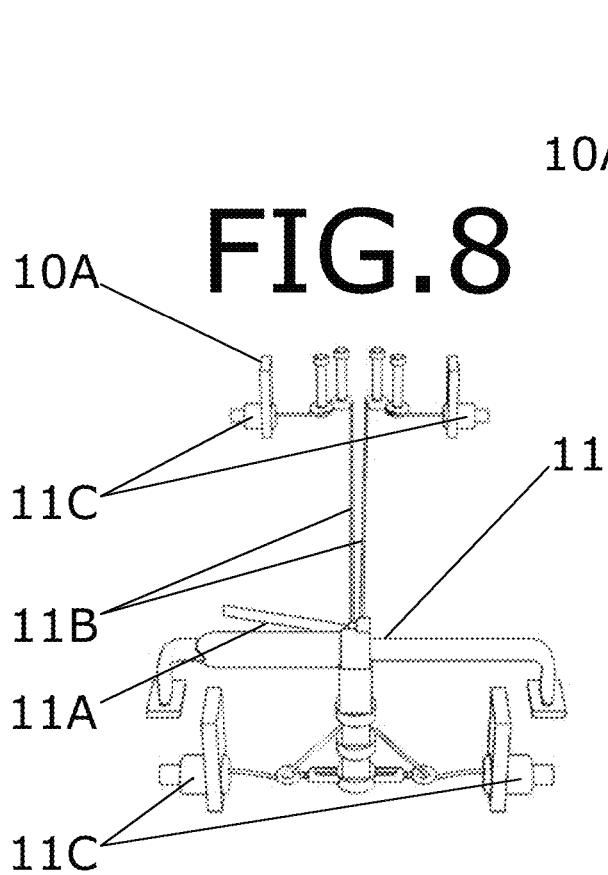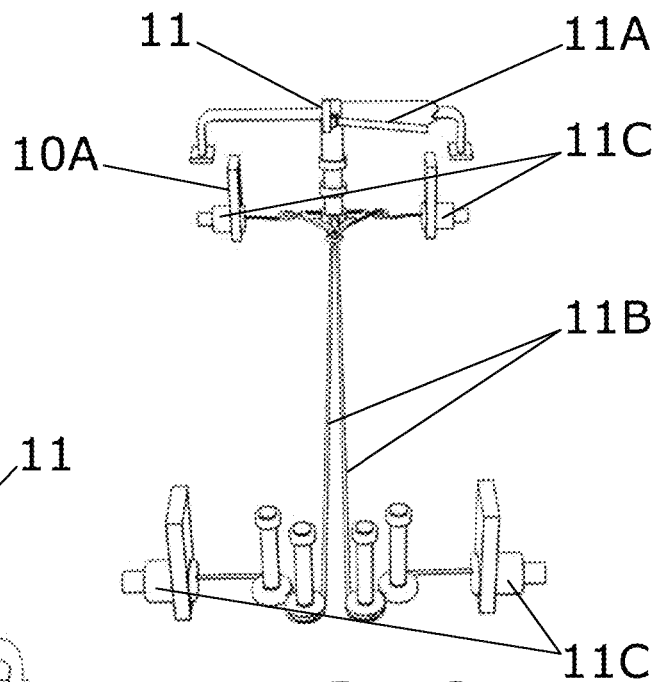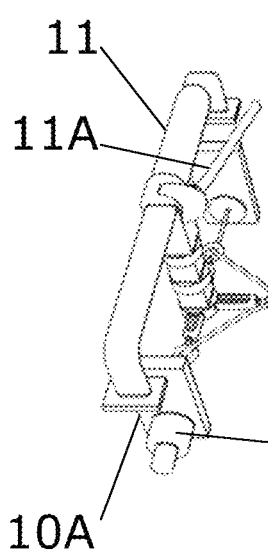

CARGO DRAWER FOR A PICKUP TRUCK

SPECIFICATION

This Application claims the benefit of U.S. Provisional Application No. 62/578,470, filed Oct. 29, 2017, which is hereby incorporated by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to truck equipment and accessories, and in particular to a cargo drawer for a pickup truck. The owners of pickup trucks often encounter knee and back pain when unloading the bed of the truck, due to reaching over the opened tailgate for heavy items.

This has led to the development of various inventions, as well as homebuilt devices, to help make the cargo more easily accessible. However, each of these devices has proven to be less than satisfactory in its own way.

Vehicle storage drawer unit, U.S. Pat. No. 4,573,731 (priority Oct. 28, 1982), provides a drawer-type storage unit for use in a vehicle having a floor defining a floor space, having a horizontally accessible access position. The storage unit defines a raised floor when installed on the vehicle floor which is adapted to support a load in a manner similar to the vehicle floor itself. The storage unit includes a drawer formed of a plurality of U-shaped channels having the legs thereof welded together and having hemmed top edges. The drawer includes a front wall which is recessed within the storage unit housing in the closed position thereof and sealed to the top and sidewalls of the housing, so as to effectively prevent passage of water and other environmental materials into the drawer in the closed position. The rear of the housing is closed and capable of being sealed. The storage unit includes a number of different rigidifying structures to provide a high strength and rigidity therein. The drawer is carried on a heavy duty roller bearing slider for facilitated movement thereof between the closed and open positions notwithstanding tools and the like in the drawer having substantial weight, such as up to 500 pounds or more. The top wall of the unit is provided with a diamond plate surface for facilitated use as a raised floor. The unit is provided with suitable skids adapted for removable bolting of the unit to the vehicle floor for facilitated installation and removal when desired.

Integrated bed drawer assembly for vehicles, U.S. Pat. No. 6,328,365 (priority Nov. 15, 1999), provides an integrated bed drawer assembly for a vehicle having a bed with a floor and sides extending upwardly and along the sides. The integrated bed drawer assembly includes a plurality of rails adapted to be spaced longitudinally and extend laterally between the sides above the floor of the bed. The integrated bed drawer assembly also includes a drawer operatively cooperating with the rails for sliding movement therealong.

Drawer for motor vehicle seat, German Patent No. DE19727131C1 (priority Jun. 26, 1997) provides a drawer which is positioned to slide between the lower surface of the motor vehicle seat and the floor of the motor vehicle. A receiving housing receives the drawer with upper form locking supports to allow manual pushing in of the drawer onto the seat underframe. The drawer is automatically retained by corresponding supports in the housing. The front wall of the housing can have a shutter which can be mounted on form locked rests.

Drawer table device for vehicle, Japanese Patent Appl. No. JPH1016623A (priority Jul. 2, 1996), provides a retractable table which may be stored in a vehicle, capable of increasing the drawing dimension of the table as much as possible while holding the table stably. A pair of sliding rails are provided which draw out, each of which is restricted by a first stopper means, assembled on guide parts on both sides of a retainer, leaving the sliding rail free to draw out and push in. As a table drawing out, the distance of which is restricted by a second stopper which is assembled between a pair of the sliding rails which are free to draw out and push in. The table is drawn out against the retainer in accordance with the restriction of the respective drawing distance by both of the first and second stopper means.

Vehicle loaded via tailgate, and having additional sub-floor drawer storage, German Patent Appl. No. DE10338755A1 (priority Aug. 23, 2003), provides a vehicle wherein at least a part of the loading floor can be raised up into a vertical position, from its horizontally-closed position. The hinge axis lies transversely and there is a catch to hold the raised position. The loading edge can be flapped down. The draw is compartmentalized with high load space flexibility. Valuables can be safely stored in the drawer and thus are not visible from the outside. Through the establishment of the loading space floor or a part of the loading space floor into an at least approximately vertical position, direct access from above to the drawer is possible. Here, the entire height between the bottom of the drawer and a cargo area cover, so a vehicle can be used for loading of the cargo hold. Oversized goods can be placed outside the load compartment at the bottom of the extended drawer and then pushed the drawer in the hold. After pulling out the drawer, a particularly simple and convenient loading is also possible from the side. Smaller weaker people are therefore given good accessibility for loading. In addition, the cargo can be removed by several people without hindrance from the vehicle body.

Vehicle rear storage drawer, U.S. Pat. No. 6,322,123 (priority Jan. 10, 2000), provides a storage compartment for the rear end of a specialty vehicle. The storage compartment has a primary compartment that is slidably mounted to the vehicle body. Sub-compartments are pivotally connected to the side walls of the primary compartment. The sub-compartments are pivoted from a closed position wherein the sub-compartments overlie a base portion of the primary compartment, to a open position wherein the sub-compartments are pivoted on a pivot connection to a position wherein they are outboard of the base. A deck lid is provided to enclose the storage compartment.

The purpose of the present invention is to provide a substantial improvement upon the existing devices, such that their disadvantages are avoided. A cargo drawer for a pickup truck, which rolls outward from the rear end of the truck on a pair of rails in much the same manner as a desk drawer, would resolve this problem.

SUMMARY OF THE INVENTION

Accordingly, the invention is directed to a cargo drawer for a pickup truck. The drawer which rolls outward from the rear end of the truck on a pair of rails in much the same manner as a desk drawer, and is designed to be sturdy and reliable, for use in any challenging environment. The drawer may be locked in place at any position along the rails. One or more handles are provided near the rear edge of the drawer, with a lever which may be pressed to release the lock. The drawer further provides a pair of folding or telescoping legs at the rear corners, to support the drawer in a fully extended position.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate one embodiment of the invention and, together with the description, serves to explain the principles of the invention.

FIG. 8 is a rear perspective view of the lock system of the first exemplary embodiment, displaying the lock system 10A, the handle 11, the lever 11A, the cables 11B, and the pads 11C.

FIG. 9 is a front perspective view of the lock system of the first exemplary embodiment, displaying the lock system 10A, the handle 11, the lever 11A, the cables 11B, and the pads 11C.

FIG. 10 is a side perspective view of the lock system of the first exemplary embodiment, displaying the lock system 10A, the handle 11, the lever 11A, the cables 11B, and the pads 11C.

DETAILED DESCRIPTION OF THE INVENTION

Figure 1:
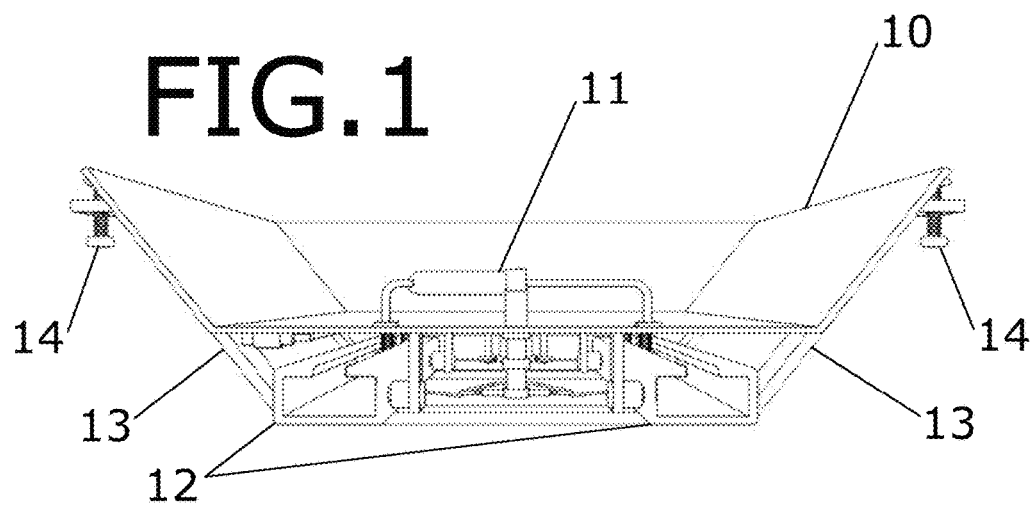
FIG. 1 is a rear view of the first exemplary embodiment, displaying the drawer 10, the handle 11, the rails 12, the mounting arms 13, and the mounting bolts 14.
Figure 2:
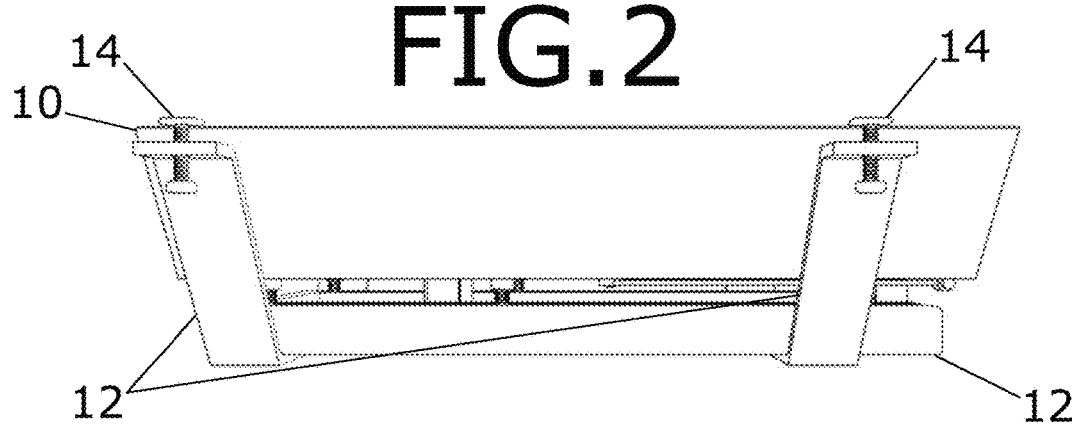
FIG. 2 is a side view of the first exemplary embodiment, displaying the drawer 10, the rails 12, the mounting arms 13, and the mounting bolts 14.
Figure 3:
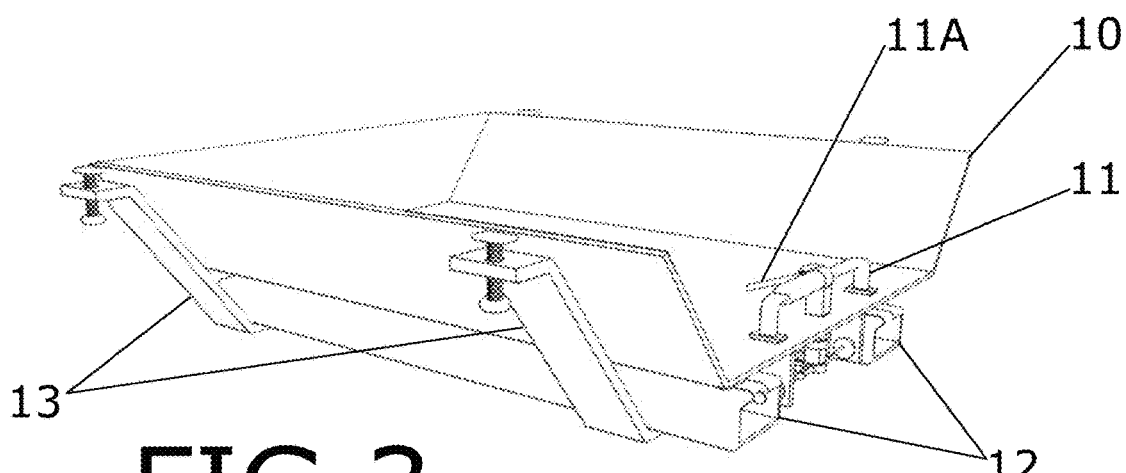
FIG. 3 is a side perspective view of the first exemplary embodiment, displaying the drawer 10, the handle 11, the rails 12, and the mounting arms 13.
Figure 4:
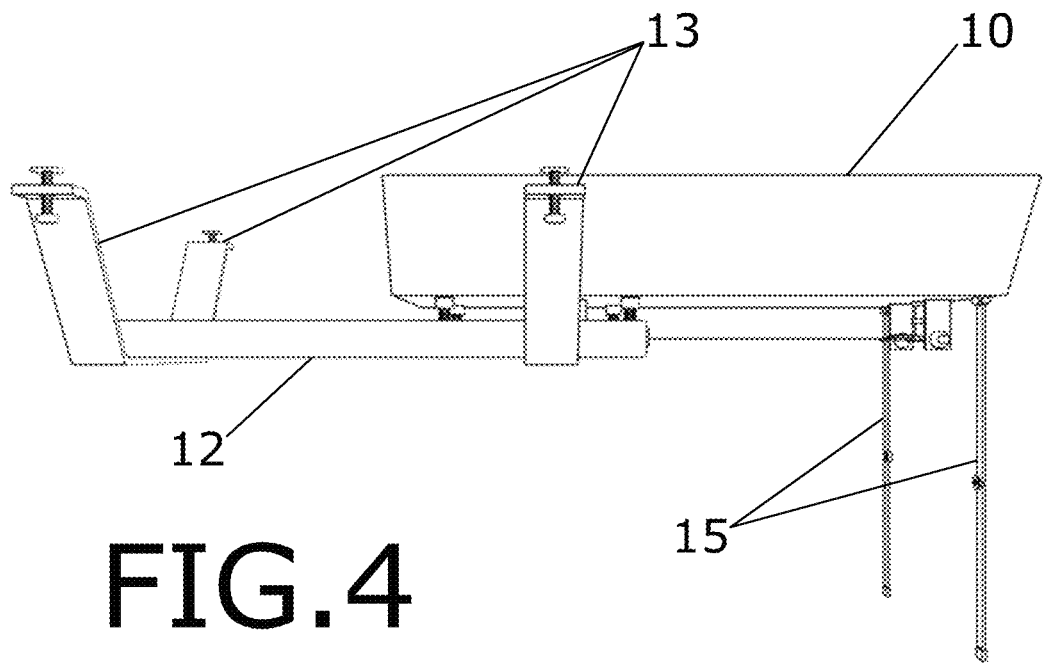
FIG. 4 is a top view of the first exemplary embodiment, displaying the drawer 10, the handle 11, the rails 12, and the mounting arms 13.
Figure 5:
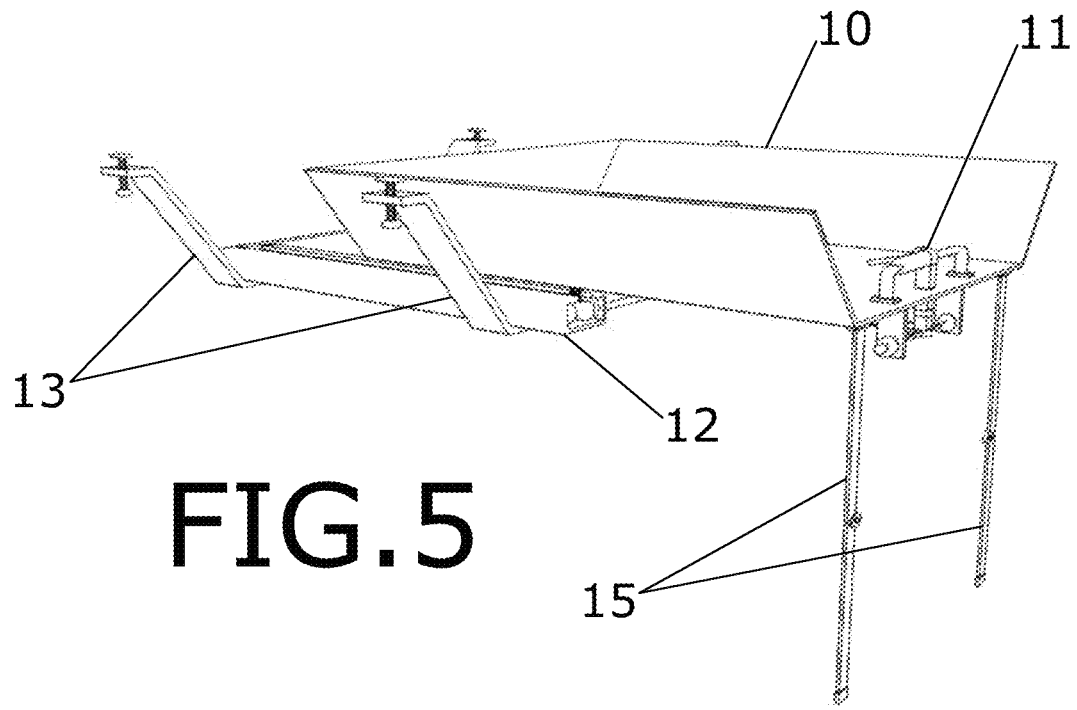
FIG. 5 is a top view of the first exemplary embodiment in an extended position, displaying the drawer 10, the handle 11, the rails 12, and the mounting arms 13.
Figure 6:
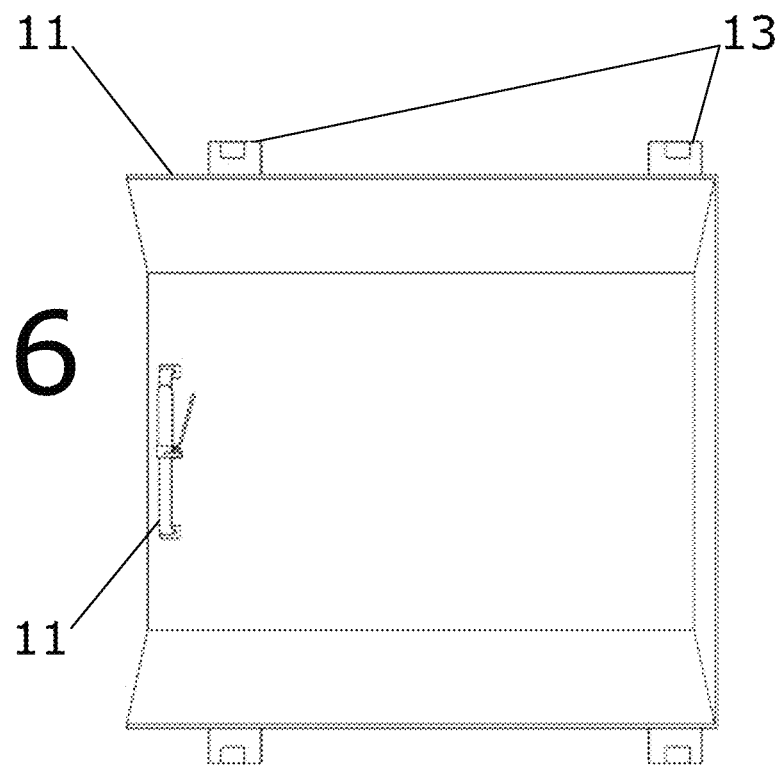
FIG. 6 is a top view of the first exemplary embodiment in an extended position, displaying the drawer 10, the handle 11, the rails 12, the mounting arms 13, and the legs 15.
Figure 7:
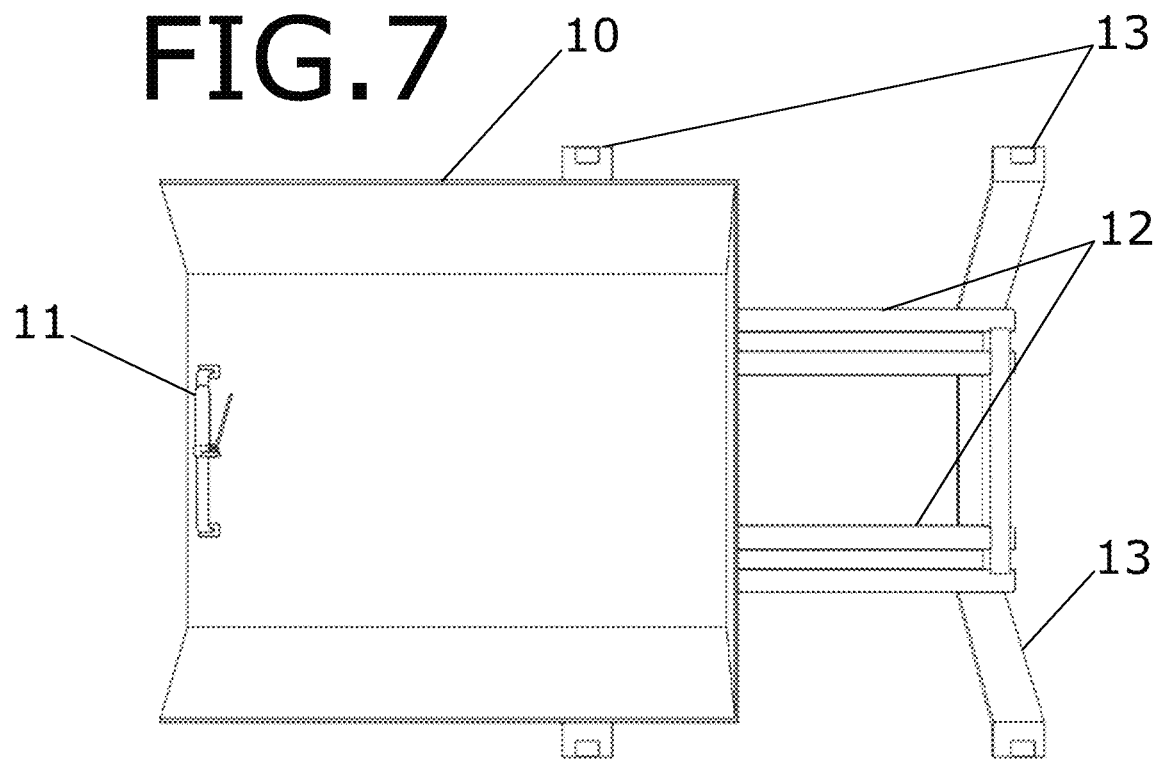
FIG. 7 is a top perspective view of the first exemplary embodiment in an extended position, displaying the drawer 10, the handle 11, the rails 12, the mounting arms 13, and the legs 15.
Figure 11:
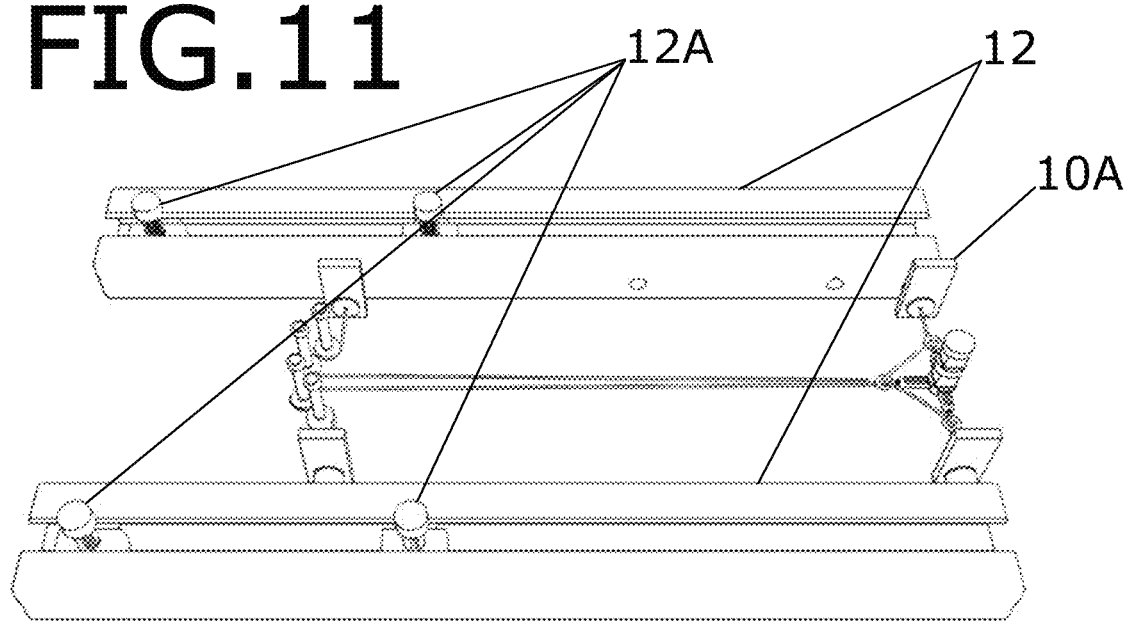
FIG. 11 is a top perspective view of the lock system and the rails of the first exemplary embodiment, displaying the lock system 10A, the rails 12, and the rollers 12A.
Figure 12:
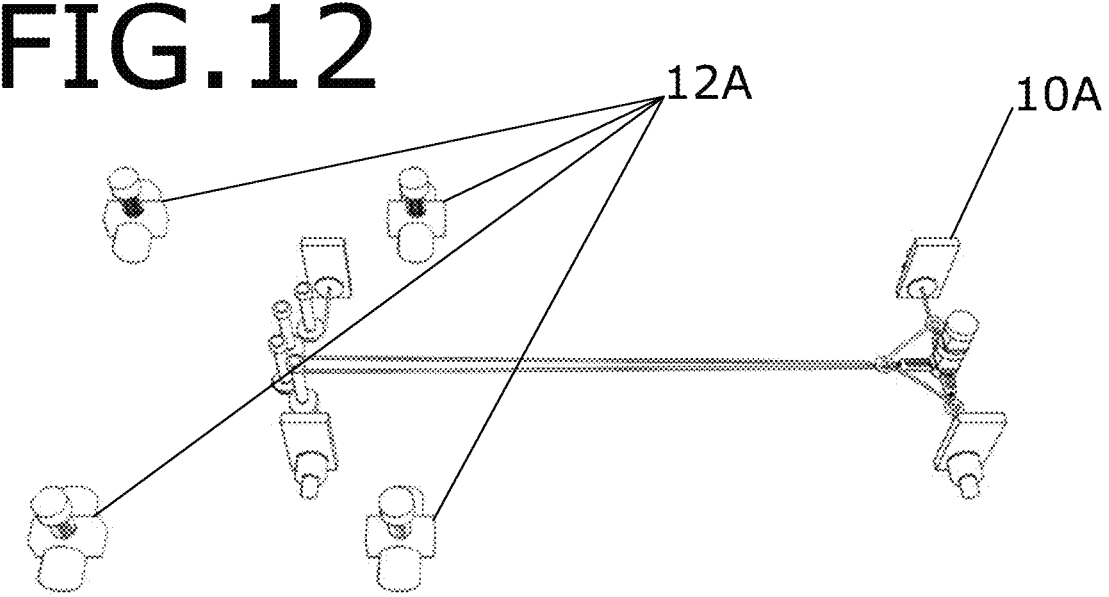
FIG. 12 is a top perspective view of the lock system and the rollers of the first exemplary embodiment, displaying the lock system 10A, and the rollers 12A.

Referring now to the invention in more detail, the invention is directed to a cargo drawer for a pickup truck.

The invention is intended for installation as an aftermarket modification by the owner of a pickup truck or similar vehicle, or by a repair or customizing shop. Alternate embodiments, intended as original equipment which may be installed by the manufacturer of the vehicle, are contemplated.

The first exemplary embodiment is comprised of a large drawer 10, which is slightly smaller than the bed of a pickup truck or similar vehicle, and intended for installation in the bed of the pickup. Alternately, the drawer 10 may be installed in the rear cargo area of a sport utility vehicle, van, or other vehicle. The drawer 10 rolls outward from the rear end of the vehicle on a pair of two-part rails 12 in much the same manner as a desk drawer, and is designed to be sturdy and reliable, for use in any challenging environment.

Rollers 12A within the rails 12 support the drawer 10, and enable the drawer 10 to travel along the rails 12. Mounting arms 13 extend upward laterally from the rails 12, terminating in mounting bolts 14 which may be used to secure the drawer 10 to the upper edges of the bed sidewalls.

The drawer 10 provides a lock system 10A, which may be used to lock the drawer 10 in place at any position along the rails 12. One or more handles 11 are provided near the rear edge of the drawer 10, with a lever 11A which may be pressed to release the lock system 10A. The drawer 10 further provides a pair of folding or telescoping legs 15 at the rear corners, to support the drawer 10 in a fully extended position.

The lock system 10A provides a pair of cables 11B affixed to the lever 10A. At the opposite ends of the cables 11B, terminating in pads 11C which press against the side surfaces of the rails 12 when the lever 11A is released, locking the drawer 10 in position. When the lever 11A is released, the pads 11C press the two parts of each two-part rail 12 together, preventing the rollers 12A from moving.

To use the first exemplary embodiment, the user may grasp the handle 11, press the lever 11A, and pull the drawer 10 backward out of the bed. The user may then release the lever 11A when the drawer 10 has reached the desired position, and lower the legs 15 to support the rear edge of the drawer 10.

The drawer 10, the handle 11, the lever 11A, the rails 12, the mounting arms 13, the mounting bolts 14, and the legs 15 are preferably manufactured from rigid, durable materials, such as aluminum alloy and steel. The pads 11C are preferably manufactured from a flexible, durable material, such as rubber or silicone.

Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A cargo drawer system for a vehicle comprising:
 a pair of two part rails secured to a bed of the vehicle;
 a large drawer comprising a planar floor and three sidewalls extending upwardly from the floor;
 a plurality of rollers positioned within the rails and configured to support the drawer such that the drawer is rollable outward from a rear end of the vehicle;
 two pairs of mounting arms extending laterally upward from the rails and terminating in mounting bolts which secure the drawer system to upper edges of sidewalls of the vehicle bed;
 a lock configured to lock the drawer in place along the rails;
 handles provided near a rear edge of the drawer comprising a lever for releasing the lock;
 a pair of foldable or telescopic legs attached to rear corners of the drawer floor; and
 a pair of cables fixed to the lever with opposite ends of the cables terminating in pads configured to press against side surfaces of the rails when the lever is released to lock the drawer in position;
 wherein a dimension of the drawer is smaller than a dimension of the bed such that the drawer fits within the bed.

* * * * *